US009507229B2

(12) United States Patent
Chen et al.

(10) Patent No.: US 9,507,229 B2
(45) Date of Patent: Nov. 29, 2016

(54) DISPLAY DEVICE

(71) Applicant: SHENZHEN CHINA STAR OPTOELECTRONICS TECHNOLOGY CO., LTD., Shenzhen (CN)

(72) Inventors: Caiqin Chen, Shenzhen (CN); Xiaoxu Lian, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 14/416,642

(22) PCT Filed: Dec. 30, 2014

(86) PCT No.: PCT/CN2014/095570
§ 371 (c)(1),
(2) Date: Jan. 23, 2015

(87) PCT Pub. No.: WO2016/011781
PCT Pub. Date: Jan. 28, 2016

(65) Prior Publication Data
US 2016/0026047 A1    Jan. 28, 2016

(30) Foreign Application Priority Data

Jul. 22, 2014  (CN) .......................... 2014 1 0351534

(51) Int. Cl.
G09G 3/36     (2006.01)
G02F 1/1362   (2006.01)
G02F 1/1345   (2006.01)

(52) U.S. Cl.
CPC ..... *G02F 1/136286* (2013.01); *G02F 1/13452* (2013.01); *G02F 1/13454* (2013.01)

(58) Field of Classification Search
CPC .................................................. G02F 1/13454
USPC ......................................................... 345/87
See application file for complete search history.

(56) References Cited

U.S. PATENT DOCUMENTS

| 5,838,287 | A | 11/1998 | Kuijk | |
| 7,499,015 | B2* | 3/2009 | Daum | G09G 3/3659 345/100 |
| 8,125,478 | B2* | 2/2012 | Lin | G09G 3/3696 345/212 |
| 2005/0156840 | A1* | 7/2005 | Kim | G09G 3/3655 345/87 |
| 2010/0155729 | A1* | 6/2010 | Yang | G02F 1/1345 257/52 |
| 2013/0057460 | A1 | 3/2013 | Guo | |

FOREIGN PATENT DOCUMENTS

| CN | 1835061 A | 9/2006 |
| CN | 1928978   | 3/2007 |
| CN | 101872093 A | 10/2010 |
| CN | 102314011 A | 1/2012 |
| CN | 104076544 A | 10/2014 |
| JP | 2-118617  | 5/1990 |

OTHER PUBLICATIONS

Office Action issued on Apr. 1, 2016, by the State Intellectual Property Office of China in corresponding Chinese Patent Application No. 201410351534.9. (8 pages).
International Search Report (Form PCT/ISA/210) and the Written Opinion (Form PCT/ISA/237) issued on Feb. 27, 2015, by the State Intellectual Property Office of China acting as the International Searching Authority in corresponding International Application No. PCT/CN2014/095570 (10 pages).

* cited by examiner

*Primary Examiner* — David Vu
*Assistant Examiner* — Brandon Fox
(74) *Attorney, Agent, or Firm* — Buchanan Ingersoll & Rooney PC

(57) ABSTRACT

In the technical field of display, a display device for solving the technical problem of H-block caused by the resistance of the wire on array is provided. The display device comprises a substrate, a gate driver circuit, and at least two chip on films for transmitting the gate driving signal. The display device further comprises at least two wirings, each chip on film being connected to the gate driver circuit through one of the wirings. The wirings each comprise a wire on array, and all or some of the wirings each further comprise a resistor in series connection with the wire on array thereof. The present disclosure can be applied to display devices, such as liquid crystal television, liquid crystal display, cell phone, and tablet PC, and the like.

4 Claims, 1 Drawing Sheet

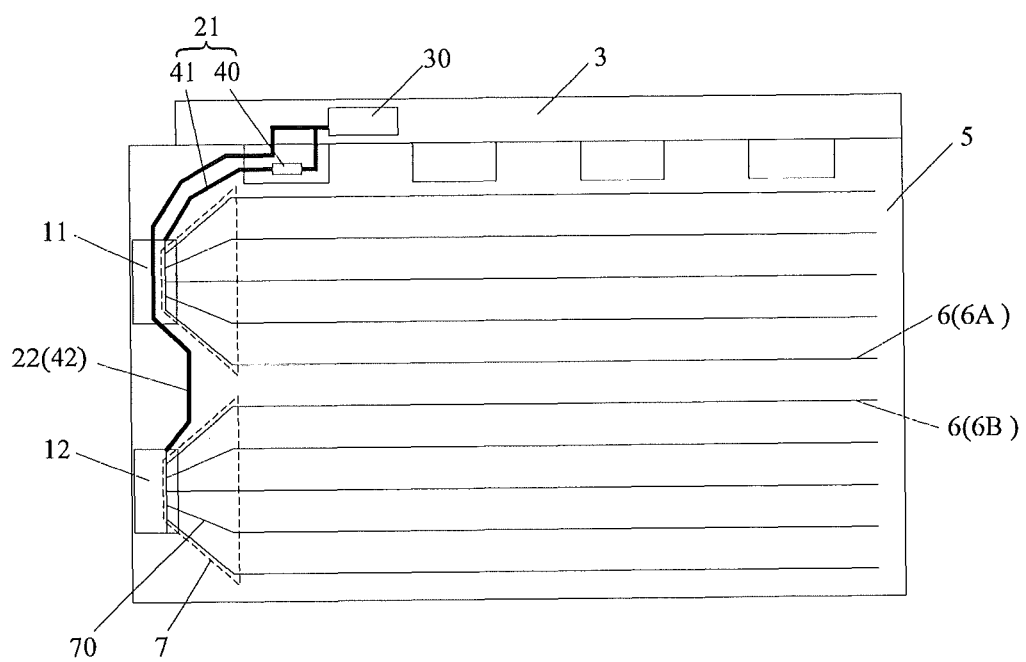

DISPLAY DEVICE

The present application claims benefit of Chinese patent application CN 201410351534.9, entitled "DISPLAY DEVICE" and filed on Jul. 22, 2014, which is incorporated herein by reference.

TECHNICAL FIELD

The present disclosure relates to the technical field of display, and in particular, to a display device.

TECHNICAL BACKGROUND

As display technology develops, a liquid crystal display device has become a commonly used panel display device. In the liquid crystal display device, the pixels are controlled by gate lines and data lines that are arranged in a staggered manner with respect to each other on a substrate, so as to display images.

At present, in order to save cost, a gate driver circuit and a data circuit are usually formed on the same printed circuit board (hereinafter referred to as PCB), and then the PCB is connected to a chip on film (hereinafter referred to as COF) for transmitting a gate driving signal through a wire on array (hereinafter referred to as WOA). The liquid crystal display device usually comprises at least two chip on films for transmitting the gate driving signal. Two adjacent chip on films are connected with each other through a WOA also. Each chip on film is connected to a fanout arranged on the substrate, and to the gate lines through the fanout.

Since the WOA has a certain resistance, the resistance of the gate line connected to the latter COF would be larger than that of the gate line connected to the former COF, rendering the waveforms of the gate driving signals on the two gate lines to be different from each other. In the meantime, at a connected position between the two adjacent chip on films, the difference between the waveform of the gate driving signal on the last gate line connected to the former chip on film and that of the gate driving signal on the first gate line connected to the latter chip on film is particularly significant. In particular, the characteristic curve of a thin film transistor (hereinafter referred to as TFT) would shift after reliability tests of high temperature and high humidity, causing either an increased leaked current or an insufficient charge of the TFT. As a result, the difference between the waveforms becomes even more significant, causing linear mura on the position of the liquid crystal display device corresponding to the connected region between adjacent COFs, i.e., H-block. Thus, the display effect of the liquid crystal display device is negatively influenced.

SUMMARY OF THE INVENTION

The objective of the present disclosure is to provide a display device for solving the technical problem of H-block caused by the resistance of a wire on array.

The present disclosure provides a display device, comprising a substrate, a gate driver circuit, and at least two chip on films for transmitting a gate driving signal, wherein the display device further comprises at least two wirings, the chip on films each being connected to the gate driver circuit through one of the wirings, and the wirings each comprise a wire on array, and all or some of the wirings each further comprise a resistor in series connection with the wire on array thereof.

Preferably, the resistance of each of the wirings is the same.

Optionally, the wirings each comprise a resistor in series connection with the wire on array thereof, and the resistances of the wires on array in any two of the wirings are different, and the difference of resistance between the resistors in the two wirings equals to the difference of resistance between the two wires on array in the two wirings.

Alternatively, the wiring connected to the last chip on film comprises the wire on array only, and the other wirings each comprise a resistor in series connection with the wire on array thereof.

Further, the resistance of the wire on array in the wiring connected to the last chip on film is larger than that of the wire on array in any of the other wirings, and the resistance of the resistor in any of the other wirings equals to the difference of resistance between the wire on array in the wiring connected with the last chip on film and the wire on array in said one of the other wirings.

Preferably, the resistor is a variable resistor.

Further, at least two fanouts and a plurality of gate lines are arranged on the substrate, and the chip on films each are connected to a corresponding one of the fanouts, and the fanouts each comprises a plurality of wires, each being connected to a corresponding one of the gate lines.

Preferably, the resistance of each of the wires is the same.

The present disclosure has the following beneficial effects. In the display device according to the present disclosure, each chip on film is connected to the gate driver circuit through a wiring, and each wiring comprises a wire on array. Because the distance between a chip on film and the gate driver circuit is different from that between another chip on film and the gate driver circuit, the lengths of the wires on array in the wirings are different. Thus, the resistances of the wires on array in the wirings are different from each other. In the present disclosure, all or some of the wirings each comprise a resistor in series connection with the wire on array thereof, so that the differences of resistances of the wires on array in the wirings can be compensated, thereby the resistances of the wirings can be close to each other, or even the same. In this case, the difference between the waveforms of the gate driving signals can be eliminated, thereby the technical problem of H-block caused by the resistance of the wire on array can be solved. Thus the display effect of the display device can be improved.

Other features and advantages of the present disclosure will be further explained in the following description, and are partially become more readily evident therefrom, or be understood through implementing the present disclosure. The objectives and advantages of the present disclosure will be achieved through the structure specifically pointed out in the description, claims, and the accompanying drawings.

BRIEF DESCRIPTION OF THE ACCOMPANYING DRAWINGS

In order to illustrate the technical solutions of the examples of the present disclosure more clearly, the accompanying drawing needed for describing the examples will be explained briefly.

FIG. 1 schematically shows a display device according to an example of the present disclosure

DETAILED DESCRIPTION OF THE EMBODIMENTS

The present disclosure will be explained in detail with reference to the embodiments and the accompanying drawings, whereby it can be fully understood about how to solve the technical problem by the technical means according to the present disclosure and achieve the technical effects thereof, and thus the technical solution according to the present disclosure can be implemented. It is important to note that as long as there is no structural conflict, various embodiments as well as the respective technical features mentioned herein may be combined with one another in any manner, and the technical solutions obtained all fall within the scope of the present disclosure.

The present disclosure provides a display device, comprising a substrate, a printed circuit board (PCB), and a plurality of chip on films for transmitting a gate driving signal and a data signal respectively.

As shown in FIG. 1, in this example, two chip on films 11 and 12 for transmitting the gate driving signal are provide. The display device further comprises two wirings 21 and 22, and the chip on films 11 and 12 each are connected to a gate driver circuit 30 in a printed circuit board 3 through one of the wirings 21 and 22. In other examples, three chip on films and three wirings, or more chip on films and more wirings can be provided.

In the present example, the wiring 21 connected to the first chip on film 11 comprises a wire on array 41, and a resistor 40 in series connection with the wire on array 41. The wiring 22 connected to the second chip on film 12 comprises a wire on array 42 only.

In the display device according to an example of the present disclosure, the chip on films 11 and 12 each are connected to the gate driver circuit 30 through one of the wirings 21 and 22, and the wiring 21 and the wiring 22 respectively comprise the wire on array 41 and the wire on array 42. Because the distance between the chip on film 11 and the gate driver circuit 30 is different from that between the chip on film 12 and the gate driver circuit 30, the lengths of the wires on array 41 and 42 respectively in the wirings 21 and 22 are different. Thus, the resistance of the wire on array 41 and that of the wire on array 42 are different from each other. In an example of the present disclosure, the wiring 21 comprises a resistor 40 in series connection with the wire on array 41 thereof, so that the difference of resistance between the wire on array 41 and the wire on array 42 can be compensated, thereby enabling the resistance of the wiring 21 and that of the wiring 22 to be as close as possible, or even the same. In this case, the difference between the waveforms of the gate driving signals can be eliminated, thereby the technical problem of H-block caused by the resistance of the wire on array can be solved. Thus the display effect of the display device can be improved.

In a preferred solution, the resistance of the wiring 21 and that of the wiring 22 are the same. In the present example, the resistance of the wire on array 42 in the wiring 22 connected to the chip on film 12 is larger than that of the wire on array 41 in the wiring 21 connected to the chip on film 11. The resistance of the resistor 40 in the wiring 21 equals to the difference of resistance between the wire on array 42 in the wiring 22 and the wire on array 41 in the wiring 21.

Further, two fanouts 7 and a plurality of gate lines 6 are arranged on the substrate 5. The chip on films 11 and 12 each are connected with a corresponding one of the fanouts 7, and then connected to the respective gate lines 6. The fanouts 7 each comprise a plurality of wires 70, each being connected to a corresponding one of the gate lines 6. Preferably, the resistance of each of the wires 70 is the same, so that the difference between the wave form of the gate driving signal on each gate line 6 and that of the gate driving signal on another gate line 6 caused by difference of resistance between the fanouts can be avoided.

In order to illustrate the resistance of the gate line 6 according to an example of the present disclosure more clearly, the resistance of the wire on array 41 in the wiring 21 can be indicated as R1. The resistance of the wire on array 42 in the wiring 22 is larger than that of the wire on array 41. The difference between the resistance of the wire on array 42 and that of the wire on array 41 is indicated as R2, i.e., the resistance of the wire on array 42 is R1+R2. The resistance of each of the wires 70 in the fanout 7 is indicated as R3. The resistance of the resistor 40 in the wiring 21 is R2', which is the same with R2. The resistance RA of the last gate line 6A connected with the chip on film 11 is as shown by the equation RA=R2'+R1+R3, and the resistance RB of the first gate line 6B connected to the chip on film 12 is as shown by the equation RB=R1+R2+R3. Because R2=R2', and thus RA=RB. That is, the resistance of the gate line 6A equals to that of the gate line 6B. In this case, the difference between the wave form of the gate driving signal on the gate line 6A and that of the gate driving signal on the gate line 6B can be eliminated, thereby the technical problem of H-block caused by the resistance of the wire on array can be solved. Thus the display effect of the display device can be improved.

Preferably, the resistor 40 can be a variable resistor. When the external environment changes, the resistances of the wires on array 41 and 42 may also change. By providing a variable resistor 40, the resistance thereof can be conveniently adjusted, so that the resistances of the wirings 21 and 22 can always be the same under different environments.

In other examples, more chip on films, wirings, and fanouts can be disposed in the display device. The wirings each can comprise a resistor in series connection with the wire on array thereof, and all the resistors are variable resistors. In this case, the resistance in each of the wirings can be adjusted easily, so that the difference between the resistances of any two of the wirings equals to the difference of resistance between the two wires on array in the two wirings. That is, the resistance of each of the wirings can be set to be the same by means of adjusting the resistance of each of the resistors in the wirings.

In addition, during the transmission of the gate driving signal through the wire on array in each of the wirings, in addition to the main interference from the resistance of the wire on array, the capacitance of the wire on array would also slightly interfere with the gate driving signal. The longer the wire on array, the larger the capacitance thereof. Thus, the resistance of the resistor in series connection with a relatively short wire on array can be slightly smaller than the difference of resistance between the relatively short wire on array and any one of the other relatively long wires on array, thereby the sum of the resistance and capacitance of the wire on array and the resistance of the resistor in the relatively short wire on array can be the same as that of the resistance and capacitance of the wire on array and the resistance of the resistor in said one of the other relatively long wires on array.

The above embodiments are described only for better understanding, rather than restricting, the present disclosure. Any person skilled in the art can make amendments to the implementing forms or details without departing from the spirit and scope of the present disclosure. The scope of the present disclosure should still be subjected to the scope defined in the claims.

The invention claimed is:

1. A display device comprising a substrate, a gate driver circuit, and at least two chip on films for transmitting a gate driving signal, wherein the display device further comprises at least two wirings, the chip on films each being connected to the gate driver circuit through one of the wirings, and the wirings each comprise a wire on array, and all or some of the wirings each further comprise a resistor in series connection with the wire on array thereof, and wherein the wirings each comprise a resistor in series connection with the wire on array thereof, and the resistances of the wires on array in any two of the wirings are different, and the difference of resistance between the resistors in the two wirings equals to the difference of resistance between the two wires on array in the two wirings.

2. A display device comprising a substrate, a gate driver circuit, and at least two chip on films for transmitting a gate driving signal, wherein the display device further comprises at least two wirings, the chip on films each being connected to the gate driver circuit through one of the wirings, and the wirings each comprise a wire on array, and all or some of the wirings each further comprise a resistor in series connection with the wire on array thereof, and wherein the wiring connected to the last chip on film comprises the wire on array only, and the other wirings each comprise a resistor in series connection with the wire on array thereof.

3. The display device according to claim 2, wherein the resistance of the wire on array in the wiring connected to the last chip on film is larger than that of the wire on array in any one of the other wirings, and the resistance of the resistor in any one of the other wirings equals to the difference of the resistance between the wire on array in the wiring connected with the last chip on film and the wire on array in said one of the other wirings.

4. A display device comprising a substrate, a gate driver circuit, and at least two chip on films for transmitting a gate driving signal, wherein the display device further comprises at least two wirings, the chip on films each being connected to the gate driver circuit through one of the wirings, and the wirings each comprise a wire on array, and all or some of the wirings each further comprise a resistor in series connection with the wire on array thereof, and wherein the resistor is a variable resistor.

* * * * *